(12) United States Patent
Lu et al.

(10) Patent No.: US 12,236,313 B2
(45) Date of Patent: Feb. 25, 2025

(54) E-INSPECTION SYSTEM FOR OFFSITE CONSTRUCTION MANUFACTURING AND TRANSPORT

(71) Applicant: THE UNIVERSITY OF HONG KONG, Hong Kong (CN)

(72) Inventors: Wilson Wei Sheng Lu, Hong Kong (CN); Anthony Garon Yeh, Hong Kong (CN); Fan Xue, Hong Kong (CN); Liupengfei Wu, Hong Kong (CN)

(73) Assignee: THE UNIVERSITY OF HONG KONG, Hong Kong (CN)

( * ) Notice: Subject to any disclaimer, the term of this patent is extended or adjusted under 35 U.S.C. 154(b) by 0 days.

(21) Appl. No.: 18/111,467

(22) Filed: Feb. 17, 2023

(65) Prior Publication Data
US 2024/0281629 A1 Aug. 22, 2024

(51) Int. Cl.
*G06K 7/14* (2006.01)
(52) U.S. Cl.
CPC ................... *G06K 7/1417* (2013.01)
(58) Field of Classification Search
CPC .................................... G06K 7/1417

USPC ......................................................... 235/375
See application file for complete search history.

(56) References Cited

U.S. PATENT DOCUMENTS

2022/0343292 A1* 10/2022 Hochman ................. B64F 5/60

* cited by examiner

*Primary Examiner* — Daniel A Hess
(74) *Attorney, Agent, or Firm* — Leason Ellis LLP

(57) ABSTRACT

A method is provided for remotely assuring the quality and transportation of offsite construction components. The method involves placing a code on the module, where the code contains identity information about the module. Then the code is scanned to obtain the identity information and to upload it to a blockchain data storage facility. Access is allowed to the identity information in the blockchain data storage facility to relevant parties for the purpose of remotely inspecting the module to verify its quality. Based on this verification the module may be delivered to a transportation facility for transport. During transport location information about the module is collected and uploading it to blockchain data storage facility. Second access is allowed to the location information stored in the blockchain data storage facility to allow relevant parties to remotely understand the transportation situation of the module.

13 Claims, 3 Drawing Sheets

S2 — The manufacturer scans the QR code attached to the module at the set production hold point using the first e-InStar computer program to obtain the identity information of the module and uses the first e-InStar computer program uploads the production photos and videos corresponding to the module to the blockchain data storage center for storage S4 — Relevant parties should use the second e-InStar computer program to obtain the production photos and videos of the module from the blockchain data storage center at the set quality inspection hold point, and perform inspections on the module according to the obtained production photos and videos of the module S6 — Before transportation, the transporter should use the first e-TranStar computer program to match the serial number of the module with the code of the multi-function IoT device. After completion, fix the IoT device on the matching module and turn on the multifunctional IoT device S8 — During the transportation process, collect the transportation data of the matching modules through the multi-function IoT device and upload the collected transportation data of the modules to the blockchain data storage center for storage. One can use the second e-TranStar computer program to obtain the transportation data of the module from the blockchain data storage center to understand the transportation situation of the module;

S10 — After the transportation is completed, turn off the multifunctional IoT device fixed on the module.

FIG. 1

E-INSPECTION SYSTEM FOR OFFSITE CONSTRUCTION MANUFACTURING AND TRANSPORT

FIELD OF THE INVENTION

The present invention relates to a quality assurance method and system for manufacturing and transport of offsite construction components and, more particularly, to such a system and method that relies on blockchain data storage.

BACKGROUND OF THE INVENTION

Currently, in general there are two construction inspection systems: one for public and the other for private projects. In public projects, the contractor is responsible for continuous supervision, and the design consultant conducts periodic inspections. Also, a project office must be set up for spot checks, and it needs to be reviewed by independent teams. In private projects, the registered general/specialist contractor is liable for continuous supervision. An authorized person, registered structural engineer and building service inspector conducts periodic inspections. Further, the client is required to perform spot checks. Also, the Buildings Department of a jurisdiction, which is the government supervision unit, is required to implement building regulations and oversees statutory inspections.

The contractors usually identify and plan inspection tasks before construction. When construction is completed, the contractor conducts an onsite inspection first. During this inspection, the contractor's inspector records the inspection result on paper-based onsite forms, based on which the inspector then completes an inspection checklist form. Depending on the inspection plan and regulations, the client representative and/or registered structural engineer, authorized person, and building service inspector may conduct re-checks on site and sign the inspection checklist form before the contractor can continue the construction procedure.

When it comes to the manufacture and transport of integrated construction modules used in construction projects, once they have been completed they must be transported to a customer, e.g., at a construction site, according to a predetermined logistics plan. The logistics company associates various of its vehicles to specific drivers, and the drivers find their corresponding vehicles based on delivery information that is part of the logistics plan. After that, the drivers check the number and status of modules loaded on vehicles, after which they can perform logistics tasks such as driving the vehicles. Later, the drivers can hand over the modules at the construction site, and the contractor's operators can check their condition and status. Upon approval, operators sign the delivery dockets, and drivers complete the logistics tasks by returning the signed delivery dockets to the manufacturer.

Finally, all inspection checklist forms are submitted to the Buildings Department for auditing purposes. Regulations, such as the Practice Note for Authorized Persons, Registered Structural Engineers and Registered Geotechnical Engineers (APP-7) (Buildings Department, 2011), detail how inspections should be conducted.

Existing blockchain solutions mainly focus on data sharing, traceability and immutability, but they cannot ensure that they help users build trust in the off-chain world. In other words, data (e.g., text-based inspection records) can be tampered with and then uploaded to the blockchain. Also, existing quality inspection technologies still require onsite inspections and inspections results need to be endorsed and signed by all parties in a fragmented and time-consuming manner. In addition, current offsite construction logistics systems have focused on the visualization of transportation status only, by providing users with a map view and location information about the modules. They do not provide secure information about the location and quality of the modules in the production and transport processes proactively.

SUMMARY OF THE INVENTION

The present invention relates to a quality assurance method and system for the manufacture and transport of offsite construction components. The method includes the following steps:

S2. The manufacturer scans a QR code attached to the module at the production site using a computation device program to obtain the identity information of the module, and uses the computation device program to upload the information, including production photos and videos corresponding for the module, to a blockchain data storage center for storage.

S4. Relevant parties use the computation device program to obtain the production photos and videos of the module from the blockchain data storage center at a production site, and perform inspections of the module according to the obtained production photos and videos of the module.

S6. Before transportation, the transporter uses a computation device program to match the serial number of the module with the code of a multi-function Internet of Things (IoT) device. After completion, the IoT device is fixed on the matching module and the multifunctional IoT device it turned on.

S8. During the transportation process, the transportation data of the matching modules is collected through the multi-function IoT device and the collected transportation data of the modules is uploaded to the blockchain data storage center for storage. A computation device program is used to obtain the transportation data of the module from the blockchain data storage center to monitor the transportation status of the module.

S10. After the transportation is completed, the multifunctional IoT device fixed on the module is turn off.

This invention enhances the quality of the supervision and inspection pf the modules, saves inspection manpower, increases end-to-end visibility with Proof of Location (POL) and monitors and assures information traceability and liability.

BRIEF DESCRIPTION OF THE DRAWINGS

The foregoing and other objects and advantages of the present invention will become more apparent when considered in connection with the following detailed description and appended drawings in which like designations denote like elements in the various views, and wherein:

FIG. 1 is a flow chart of a supply chain quality assurance method for cross-border offsite construction production and transportation according to an embodiment of the present invention;

DETAILED DESCRIPTION OF THE INVENTION

Figure 2:
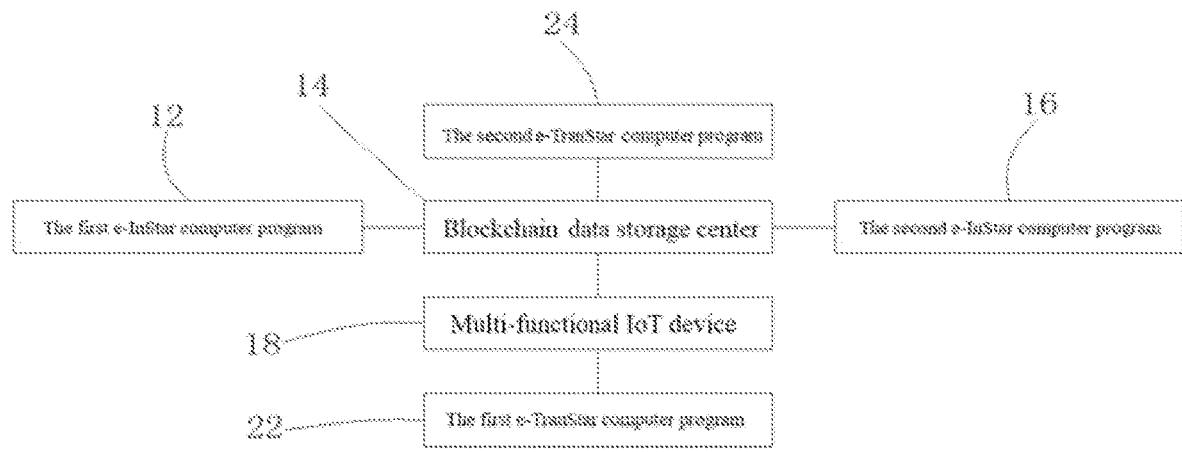
FIG. 2 is block diagram of the supply chain quality assurance system of the present invention for carrying out the method of FIG. 1.

FIG. 1 illustrates the steps of the supply chain quality assurance method for offsite, including cross-border construction production and transportation according to the present invention. The first or production stage includes the Step S2. At that step the manufacturer of the offsite construction component scans a QR code attached to the module at a set production hold point using a first computation device program 12 (herein called e-InStar) as shown in FIG. 2 to obtain the identity information of the module. The first e-InStar computation device program 12 uploads the identity information of the module, e.g., production photos and videos corresponding to the module, to a blockchain data storage facility or center 14 for storage. The production hold point is the point in time when the module production is completed.

Before module production, a naming convention standard for the module is created, which standard assigns a unique number for each module. The standard, which can be implemented by a computation device system also and generates a QR code based on the number. The QR code may contain the block number, floor number, installation sequence, installation position (for example, No. 1 in district one) and type of module.

Before using the first e-InStar computation device program 12 for the first time, the manufacturer typically needs to register an account on the first e-InStar computation device program 12 and set a user login ID and password. For additional security, the user can also associate the users' fingerprint with the account. This information is directly input when logging in to the first e-InStar computation device program 12.

Figure 4:
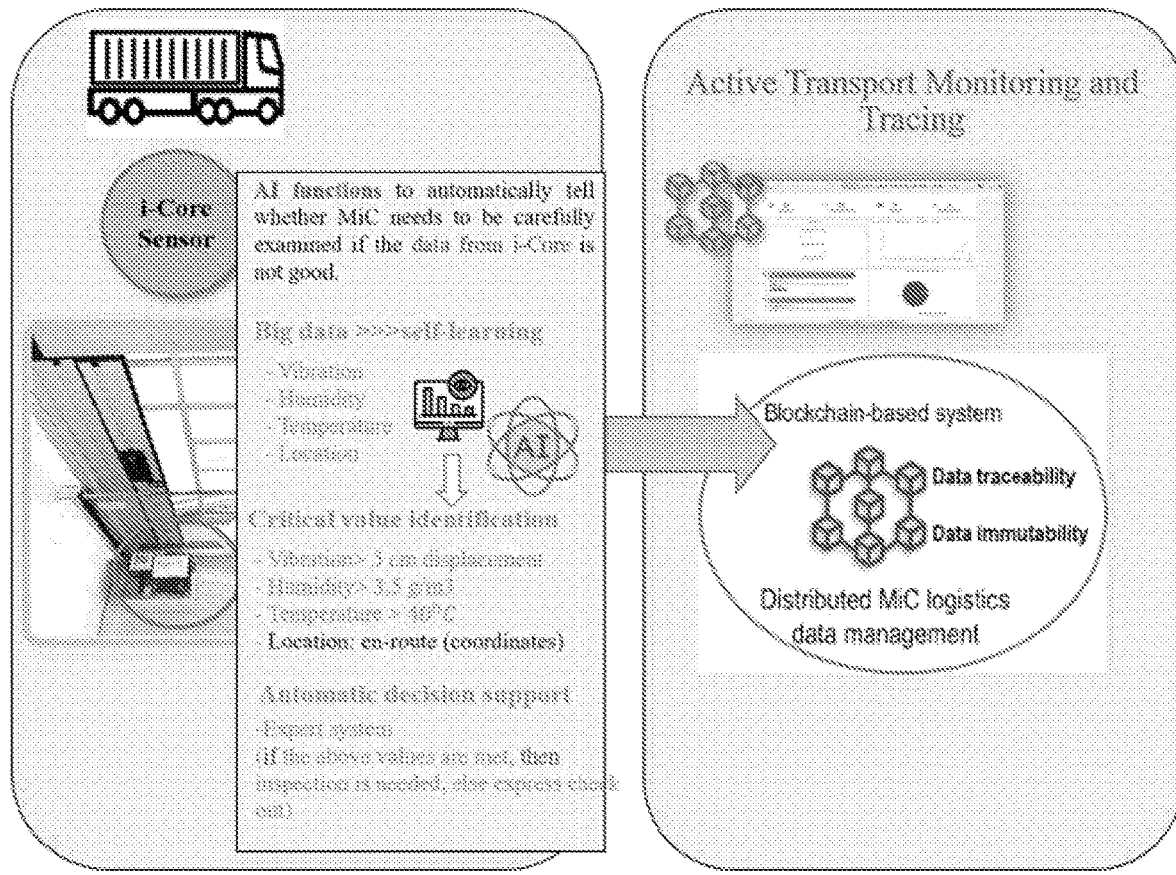
FIG. 4 illustrates information from the IoT device being uploaded to a blockchain storage facility.

In this embodiment, the manufacturer also uploads the production photos and videos corresponding to the module to the blockchain data storage center 14 for storage by using the first e-InStar computation device program 12. FIG. 4. Specifically, the manufacturer clicks the "Upload" button on the computation device running the e-InStar computation device program 12, which button may be a symbol on a touch screen of the device. After selecting the production photos and videos corresponding to the module by engaging the touch screen, the user may click a "Submit" button on the touch screen, so that the production photos and videos corresponding to the module can be uploaded to the blockchain data storage center 14 for storage. While uploading the production photos and videos corresponding to the modules to the blockchain data storage center 14 for storage, postscripts submitted by the manufacturer in a message box of the first e-InStar computation device program 12 can also be uploaded to the blockchain data storage center 14 for storage. The manufacturer's postscript is, for example, the material and function description of the module.

Figure 3:
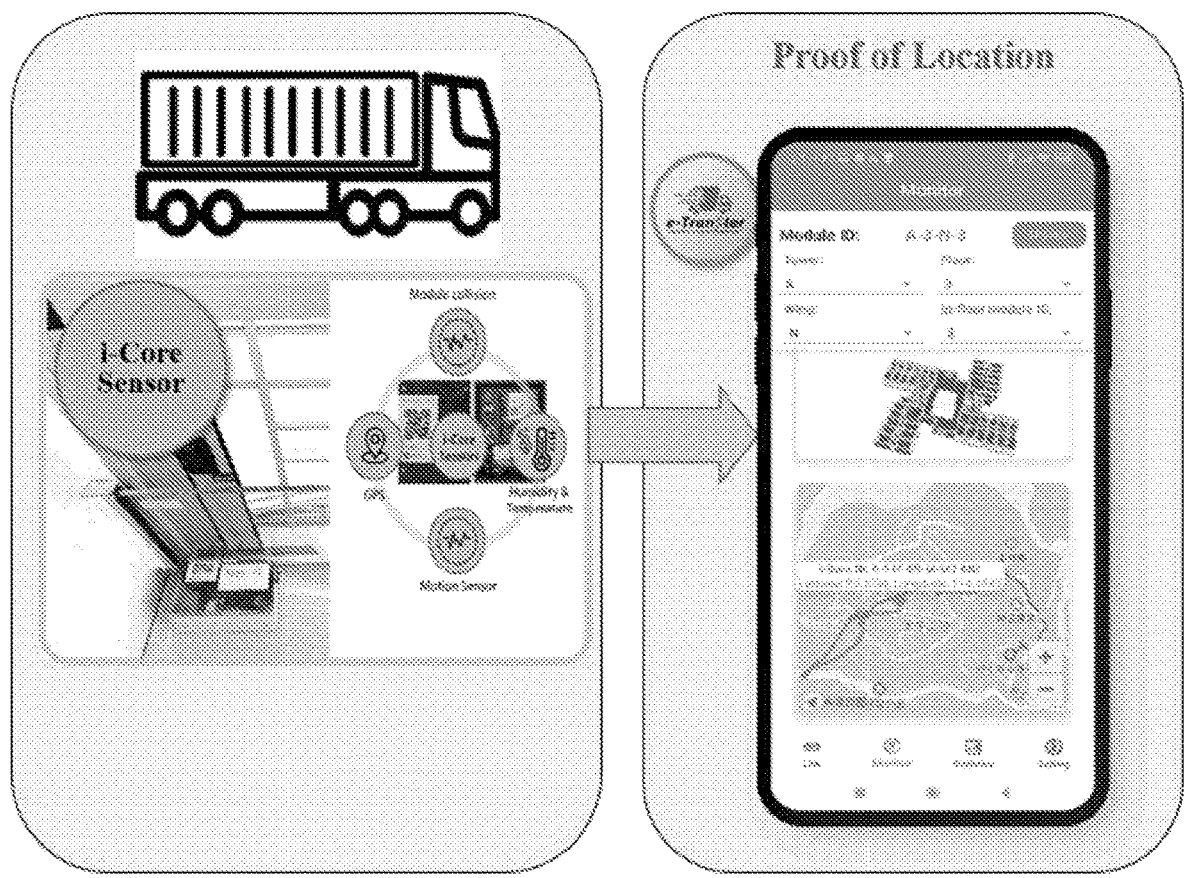
FIG. 3 illustrates an IoT sensor device attached to a offsite construction component and accessed by a smartphone.

At step S4 relevant parties can use a second e-InStar computation device program 16 to obtain the production photos and videos of the module from the blockchain data storage center 14 at the set quality inspection hold point. FIG. 3 This can be achieved by the relevant party clicking the "View" button on the screen of the computing device running the second e-InStar computation device program 16, which can be a smart phone or other computing device. The relevant party can thus obtain the production photos and videos of the module from the blockchain data storage center 14. According to the obtained production photos and videos of the module, the quality verification of the module is carried out. This can be done remotely by the customer or other inspection party using a smart phone. If the quality meets the standard, the second e-InStar computation device program 16 is used to send a message that the module has passed the verification to the first e-InStar computation device program 12 of the manufacturer. Based on this message the manufacturer can hand over the module to the transporter for transportation to the customer, i.e., after receiving the message from the first e-InStar computation device program 12 that the module passed the verification test.

In the above step S4, if the quality of the module does not meet the standard, then the second e-InStar computation device program 16 can be used to send a message that the verification failed and a message that rework of the module is required to the first e-InStar computation device program 12 of the manufacturer. After the manufacturer receives the messages that the verification failed and rework is required, the manufacturer can use the first e-InStar computation device program 12 to order that the module be remanufactured or alternatively discarded. After the rework is completed, steps S2 and S4 can be repeated until the quality of the module meets the standard.

Relevant parties can use the second e-InStar computation device program 16 to send a message that the module passed the verification to the first e-InStar computation device program 12 of the manufacturer. In particular, the relevant party can click a "Pass" button on the computing device screen running the second e-InStar computation device program 16, and the second e-InStar computation device program 16 will send a verification passed message to the first e-InStar computation device program 12 according to the program instructions. Relevant parties use the second e-InStar computation device program 16 to send the message that the verification failed and the message that requires rework to the first e-InStar computation device program 12 of the manufacturer. In particular the relevant party can click a "failure" button on the touch screen of the device running the second e-InStar computation device program 16, and the second e-InStar computation device program 16 will send a verification failed message and a rework required message the first e-InStar computation device program 12 according to the program instructions. In this step S4, the quality inspection hold point is the point when quality inspection of the module is performed. Relevant parties are, for example, customers, registered structural engineers and other authorized persons of the supervisory party.

As with use of the first e-InStar computation device program, when the relevant parties use the second e-InStar computation device program 16 for the first time, they need to register an account on the second e-InStar computation device program 16. This requires that they set a user ID and a login password. They may also, optionally enter the users' fingerprint. Then the ID, password and perhaps the finger print are directly input to the second e-InStar computation device program 16 when logging into it.

When the manufacturer uploads the manufacturer's postscript to the blockchain data storage center 14 for storage using the first e-InStar computation device program 12, the relevant party can also use the second e-InStar computation device program 16 to obtain a postscript uploaded by the manufacturer from the blockchain data storage center 14. The second e-InStar computation device program 16 also uploads the verification passed message, the verification failed message and the rework message to the blockchain data storage center 14 for storage.

Both the first e-InStar computation device program 12 and the second e-InStar computation device program 16 are coded with a standardized inspection process for offsite construction, so as to facilitate the manufacturer's ability to upload the production photos and videos of the module. They are also coded to make it convenient for the relevant parties to verify the quality of modules.

Step S6 begins the transportation stage. However, in Step 6 before transportation actually starts, the transporter uses a first e-TranStar computation device program to match the serial number of the module with the code of the multi-function IoT device 18. After completion, the IoT device 18 is fixed on the on the matching module and the multifunctional IoT device is turned on FIG. 3. In this way, the multifunctional IoT device 18 can start working.

During step S6, the transporter is, for example, a logistics provider or the like, e.g., a trucking company. When using the first e-TranStar computation device program 22 for the first time, the transporter needs to register an account on the first e-TranStar computation device program 22. This is done similar to the registration of relevant users on the e-InStar program. In particular the transporter sets a login ID and password and perhaps enters the users' fingerprint. These are directly entered when logging into the first e-TranStar computation device program 22.

Transport users can match the serial number of the module with the code of the multifunctional IoT device 18. Specifically, the transporter scans the QR code on the module and loads it into the first e-TranStar computation device program 22. After the QR code is recognized, the transporter can click the "Match" button on the interface (e.g., touch screen display) of the computation device that runs the first e-TranStar computation device program 22. The transporter can then enter the code on the multi-function IoT device 18, such as 05, and click the "Confirm" button on the interface. When "Matching Success" is displayed on the interface of the device running the first e-TranStar computation device program 22, it means that the serial number of the module and the code of the multi-functional Internet of Things device 18 have been matched.

Step S8 is part of the transportation stage. During the transportation process, the multi-functional IoT device 18 collects the transportation data of the matching modules and uploads the collected transportation data of the modules to the blockchain data storage center 14 for storage. Relevant parties can then use the second e-TranStar computation device program 24 to obtain the transportation data of the module from the blockchain data storage center 14. FIG. 4. For example, the relevant party can click the "view" button on interface or display of the computing device running the second e-TranStar computation device program 24 to obtain the module from the blockchain data storage center 14. This allows the parties to understand the transportation situation of the module, so that the transportation of the module can be monitored. The transportation data includes the position, humidity, temperature and collision data of the module.

When using a second e-TranStar computation device program 24 for the first time, the relevant party needs to register an account on the second e-TranStar computation device program 24, i.e., to set a login ID and password and perhaps the users' fingerprint. Then the relevant party logs into the second e-TranStar program using this information.

In step S10, after the transportation is completed, the multifunctional IoT device 18 fixed on the module is turned off.

As shown in FIG. 2, the present invention also provides a supply chain quality assurance system for the production and transportation of offsite (including cross-border) construction components based on the method in FIG. 1, which is performed by the first e-InStar computation device program 12, blockchain data storage center 14, second e-InStar computation device program 16, the multi-functional IoT device 18, first e-TranStar computation device program 22 and second e-TranStar computation device program 24. Use of the first and second e-TranStar computation device programs 22, 24 can be by means of a smart phone with an easy-to-transfer mobile APP. FIGS. 3 and 4.

Figure 5:
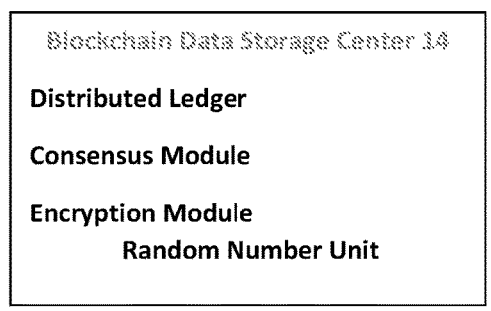
FIG. 5 illustrates the Blockchain Data Storage Center.

In this embodiment, the blockchain data storage center 14 includes a distributed ledger module, a consensus module, and an encryption module. FIG. 5. The blockchain data storage center 14 has production photos and videos of the modules and a postscript from the manufacturer, The transportation data of the module, the verification passed message the verification failed message and the rework message involve the following steps:

Through the distributed ledger module, the production photos and videos of the modules, and postscripts of the manufacturer are uploaded by the first e-InStar computation device program 12. The transportation data is uploaded by the multi-functional IoT device 18. The verification pass message, the verification fail message and the rework are uploaded by the second e-InStar computation device program 16 and are stored. The specific working principle is that the distributed ledger module orders the received data according to the ordering node and forms a new block according to preset rules. Each block refers to the previous block to form a chain structure, and each block carries a timestamp to facilitate and ensure data traceability. The node ledger is distributed on multiple nodes, and each node keeps a complete copy of the node ledger. The distributed ledger module can automatically synchronize and verify transactions on all nodes, and can share and update data to the node ledgers of other authorized parties, so it is transparent to all participating members and ensures data transparency.

The correctness of the data stored in the distributed ledger module is checked through the consensus module. Since the distributed ledger module can share and update data to the node ledgers of other authorized parties, the authorized parties can check the correctness of the collected data and submit the verification results through the consensus mechanism. Only after authorized parties checking and confirming that the data is correct, will the received data be stored in the node ledger.

The data stored in the distributed ledger module is encrypted by an encryption module to ensure the security of the data. Specifically, the encryption module encrypts the hash value of the data stored in the distributed ledger module. The encryption algorithm, for example, uses the SHA-256 compression function to perform a 512-bit block and produce a 256-bit hash value.

In order to further improve the security of the data, the encryption module of the present invention has a random number security encryption unit. When the random number security encryption unit is performing an encryption operation, the random number is first added to the block number in random order, and each encryption will be randomized. Then a sixteen-digit string is generated where the first eight strings are random strings containing numbers and uppercase and lowercase letters. The last eight strings are random numbers, which correspond to the first eight characters one by one to indicate the position inserted into the block number. Finally, the first four random numbers are put at the front of the encrypted string, and the last four random numbers are put at the end of the encrypted string, so that the user can specify the encrypted position when decrypting, thereby generating the final result. Afterwards, SHA-256 encryption is performed to increase the complexity of cracking the encryption, thereby further improving data security.

The method of the present invention allows the manufacturer, at the offsite or offshore production stage, to scan the QR code attached to the module at the set production hold point using the first e-InStar computation device program 12 to obtain the identity information of the module. The first e-InStar computation device program 12 also uploads the production photos and videos corresponding to the module to the blockchain data storage center 14 for storage. Relevant parties can use the second e-InStar computation device program 16 to obtain the production photos and videos of the module from the blockchain data storage center 14 at the set quality inspection hold point so they can perform inspections of the module according to the obtained production photos and videos of the module. In this way, the relevant parties can check the quality of the modules without physically visiting the manufacturer's production site, which can help to realize remote cross-border quality inspection of the modules and reduce the cost of inspection.

Before transportation, the transporter can use the first e-TranStar computation device program 22 to match the serial number of the module with the code of the multifunction IoT device 18. After completion, the IoT device 18 should be fixed on the matching module and the multifunctional IoT device 18 turned on. Relevant parties can use the second e-TranStar computation device program 24 to determine the transportation status of the module in real-time, such as location, humidity, temperature, collision conditions, etc., so that real-time monitoring of the transportation of the module can be realized. The production photos and videos of the module and the transportation data of the module are stored through the blockchain data storage center 14, which can ensure the transparency, security and validity of the data. When the module has a quality problem, the data storage center can trace the responsibility for that problem through the blockchain of the manufacturer and transporter, by checking the immutable data.

For the device of the present invention, in the production stage, Escenda mobile APP12 uploads the production photos and videos corresponding to the module to the blockchain data storage center 14 for storage, and the relevant parties can obtain the module data from the blockchain data storage center 14 through the second Escenda mobile APP16. The IoT 18 may be an i-Core multi-functional Internet of Things device. The i-Core can collect location, humidity, temperature, and vibration data of modules during transportation and its associated artificial intelligence (AI) capabilities can automate decision-making based on i-Core collected data for quality assurance. The method of the present invention allows, in the offsite or offshore production stage, the relevant parties to check the quality of the module without visiting the manufacturer's production site, which achieves remote cross-border quality inspection of the module and reduces the inspection cost.

The first e-InStar computation device program 12 is used to scan the QR code attached to the module to obtain the identity information of the module, and to upload the corresponding production photos and videos of the module and the postscript of the manufacturer to the blockchain data storage center 14 for storage. The manufacturer's postscript is, for example, the material and function description of the module.

Before module production, the user creates a naming convention standard for the module, which provides a unique serial number for each module. A code generator generates a QR code for the module based on the number. The QR code contains the block number, floor number, installation sequence, installation position (for example, No. 1 in district one) and type of module.

Before using the first e-InStar computation device program 12 for the first time, the manufacturer registers an account on the first e-InStar computation device program 12, by setting a login password and a user ID, which may be the users' fingerprint or the user's fingerprint may be an additional input. This information is then directly input when logging into the first e-InStar computation device program 12.

The second e-InStar computation device program 16 is used to obtain the production photos and videos of the module from the blockchain data storage center 14, the manufacturer's postscript, and to send the message to the first e-InStar computation device program 12 when the quality of the module meets the standard so that the manufacturer can hand over the module to the transporter for transportation after receiving the passed verification message verification through the first e-InStar computation device program 12, and it can be also used to send a failed verification message when the quality of the module does not meet the standard. Thus, the manufacturer will rework the module after receiving the message that the verification fails and the message that the module requires rework. The first e-InStar computation device program 12 will also be used to upload the verification passed message, the verification failed message and the rework message to the blockchain data storage center 14 for storage.

When the relevant parties use the second e-InStar computation device program 16 for the first time, they need to register an account on the second e-InStar computation device program 16 by setting a login password and a users' ID (e.g., fingerprint). Then this information is directly input it when logging into and using the second e-InStar computation device program 16.

The first e-TranStar computation device program 22 is used to match the serial number of the module with the code of the multifunctional IoT device 18.

Like the e-Instar programs, when using the first e-TranStar computation device program 22 for the first time, the transporter needs to register an account on the first e-TranStar computation device program 22 by setting a login password and user's ID (e.g., the user's fingerprint). Then this information is directly entered into the e-TranStar program when ever logging into and using the first easy-to-transfer mobile APP22 or program.

The multi-functional IoT device 18 is also used to collect the transportation data of the module and upload the collected transportation data to the blockchain data storage center 14 for storage, so that relevant parties can use the second e-TranStar computation device program 24 from the blockchain data storage center 14 to obtain transportation data about the modules and to understand the transportation conditions of the modules. The transportation data includes the module's location, humidity, temperature and vibration data.

The second e-TranStar computation device program 24 is used to obtain the transportation data of the module from the blockchain data storage center 14, so that the relevant parties can instantly understand the transportation situation of the module through the e-TranStar computation device program 24, so as to realize the module transportation is monitored.

When the relevant parties use the second e-TranStar computation device program 24 for the first time, they need to register an account on the second e-TranStar computation device program 24 and set a login password and enter the users' fingerprint, and then directly input it when using the e-TranStar computation device program 24 password and fingerprint to log in.

The blockchain data storage center 14 is used to store the production photos and videos of the modules uploaded by the first e-InStar computation device program 12, and the postscripts of the manufacturers, and the multi-functional IoT 18-collected transportation data, and it is used to store the message of passing the verification, the message of failing the verification and the message of requiring rework uploaded by the second e-InStar computation device program APP16.

For the device of the present invention, in the production stage, the manufacturer can scan the QR code attached to the module through the e-InStar computation device program 12 to obtain the identity information of the module, and pass the second module according to the obtained identity information of the module. One Escenda mobile APP12 uploads the production photos and videos corresponding to the module to the blockchain data storage center 14 for storage, and the relevant parties can obtain the module from the blockchain data storage center 14 through the second Escenda mobile APP16. The production photos and videos of the module group allow the relevant parties to verify the quality of the modules so they can check the quality of the modules without visiting the production site.

The transporter matches the serial number of the module with the code of the i-Core multi-functional Internet of Things device 18 through the first easy transfer mobile APP22, so that The transportation data of the module can be collected through the i-Core multifunctional IoT device 18, and the relevant parties can instantly understand the transportation situation of the module through the second easy-to-transfer mobile APP24, such as location, humidity, temperature and collision conditions, etc. In this way, real-time monitoring of the transportation of the modules can be realized. Further, the production photos and videos of the modules and the transportation data of the modules can be stored through the block chain data storage center 14, which can ensure the transparency, security and correctness of the data. When a module has a transportation quality problem, the responsibility of the transporter can be traced through the blockchain data storage center 14, which is highly traceable and cannot be tampered with.

The method of the present invention allows, in the offsite or offshore production stage, the manufacturer to scan the QR code attached to the module at the set production hold point using the first e-InStar computation device program 12 to obtain the identity information of the module, and uses the first e-InStar computation device program 12 to upload the production photos and videos corresponding to the module to the blockchain data storage center 14 for storage. Relevant parties can use the second e-InStar computation device program 16 to obtain the production photos and videos of the module from the blockchain data storage center 14 at the set quality inspection hold point, and perform inspections on the module according to the obtained production photos and videos of the module. In this way, the relevant parties can check the quality of the module without visiting the manufacturer's production site, which can realize remote cross-border quality inspection of the module and reduce the inspection cost. Before transportation, the transporter can use the first e-TranStar computation device program 22 to match the serial number of the module with the code of the multi-function IoT device 18. After completion of production, the IoT device 18 is fixed on the on the matching module and turned on. Relevant parties can use the second c-TranStar computation device program 24 to know the transportation status of the module in real-time.

In summary, the present invention provides digital blockchain security system for monitoring the quality of a produced module, assuring that data about the module is accurate and tracing the entire production and transport process. It accomplishes this by using photos and videos of the module uploaded by a smart phone application to a blockchain storage center. Further, data such as humidity, temperature, collision, and proof of location (POL) is collected by an i-Core IoT and sent to the blockchain, which provides security of quality monitoring and tracing of the whole production and transport process to ensure the authenticity of the uploaded data through cross-checking.

The invention also provides a transparent digital secure consensus mechanism. In particular the inspection system transparently shares the remote quality inspection results through the blockchain distributed ledgers, and then requires endorsements from corresponding parties through the blockchain consensus mechanism based on the offsite construction component ID.

Further the invention provides remote en-route quality control in that the system collects the humidity, temperature, collision and PoL data of the modules during transportation to control the quality and identify liability in the transport process. In addition, artificial intelligence (AI) capabilities take that one step further and automate decision-making for the companies for quality assurance.

The above are only specific implementations of the invention and are not intended to limit the scope of protection of the invention. Any modifications or substitutes apparent to those skilled in the art shall fall within the scope of protection of the invention. Therefore, the protected scope of the invention shall be subject to the scope of protection of the claims.

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A method for remotely assuring the quality and transportation of offsite construction components, comprising the steps of:

placing a scannable code on the module at a production stage, said code containing identity information about the module;

scanning the code at a production hold point to obtain the identity information;

uploading the identity information to a blockchain data storage facility for storage;

allowing access to the identity information stored in the blockchain data storage facility to relevant parties and remotely inspecting the module to verify its quality;

generating one of a passed verified message and a failed verification message;

delivering the module to a transportation facility for transport on the basis of a passed verified message;

reworking or discarding the module on the basis of a failed verification message;

at the start of transport, matching a serial number of the module to the code;

during transport continuously collecting real-time location information about the module while it is in motion and uploading it to blockchain data storage facility; and allowing access to the location information stored in the blockchain data storage to relevant parties for the purpose of remotely understanding the transportation situation of the module.

2. The method of claim 1 wherein the identity information about the module includes production photos and videos.

3. The method of claim 2 wherein the identity information about the module includes a block number, floor number, installation sequence, installation position and type of module.

4. The method of claim 1 wherein the transport information further includes the humidity, temperature and collision or vibration data of the module.

5. The method of claim 1 wherein the steps of scanning the code and uploading the identity information to a blockchain data storage facility are under the control of a first computation device program running on a first computing device, and the steps of generating verification messages and a rework message are under the control of a second computation device program running on a second computing device.

6. The method of claim 1 wherein a manufacturer's postscript is uploaded to the blockchain data storage facility.

7. The method of claim 1 wherein the scannable code is provided in the form of a multifunctional Internet of Things (IoT) device fixed on the module and wherein the IoT device also provides the real-time location information about the module while it is in motion during transport.

8. The method of claim 7 wherein a third computation device program running on a computing device is used to match a serial number of the module with the code of the multi-function IoT device.

9. The method of claim 7 further including the step of turning off the IoT when transport is completed.

10. A system for remotely assuring the quality and transportation of offsite construction components comprising:

a blockchain data storage facility;

a first computation device program running on a first computing device for controlling scanning of a module code affixed on the module, where the module code contains identifying information about the module, said first computing device further uploading the identifying information to the blockchain data storage facility;

a second computation device program running on a second computing device and allowing access to the identifying information in the blockchain data storage facility and allowing remote inspection of the module to verify its quality, said second computing device further providing one of a passed verification message and a failed verification message upon activation by a user viewing the identifying information;

a multifunction Internet of Things (IoT) device attached to the module and providing continuous real-time transport information at least related to the location of the module while the module is in motion during transportation, and providing the information to the blockchain data storage facility; and a third computation device program running on a third computing device for matching a serial number of the module with the module code of the multi-function IoT device.

11. The system of claim 10 wherein at least one of the computing devices is a smart phone.

12. The system of claim 10 wherein the blockchain data storage facility includes a distributed ledger module, a consensus module, and an encryption module.

13. The system of claim 12 wherein the encryption module includes a random number security encryption unit.

* * * * *